May 24, 1966   E. R. DE VRIES   3,252,376
REFLEX REFLECTIVE GRANULE AND MARKING MATERIAL MADE THEREOF
Filed Feb. 16, 1962   2 Sheets-Sheet 1

INVENTOR.
Eduard R. de Vries
BY
Karl W. Flocks
ATTORNEY

May 24, 1966  E. R. DE VRIES  3,252,376
REFLEX REFLECTIVE GRANULE AND MARKING MATERIAL MADE THEREOF
Filed Feb. 16, 1962  2 Sheets-Sheet 2

INVENTOR.
Eduard R. deVries
BY
Karl W. Flocks
ATTORNEY

United States Patent Office 3,252,376
Patented May 24, 1966

3,252,376
REFLEX REFLECTIVE GRANULE AND MARKING MATERIAL MADE THEREOF
Eduard R. De Vries, Huntingdon, Pa., assignor to Prismo Safety Corporation, Huntingdon, Pa., a corporation of Pennsylvania
Filed Feb. 16, 1962, Ser. No. 173,638
12 Claims. (Cl. 88—82)

The present invention relates to reflective material and more particularly to reflective granules, the method of making them and their use in reflective marking.

Heretofore in highway markers it has become standard practice to incorporate small glass spheres in the traffic paint either as a premix or by dropping the glass spheres onto the paint while it is still tacky so that the spheres are partially embedded in the paint when it has dried. These spheres render the marker reflex reflective and reflect the light from the headlights of automobiles back to the source. Difficulties have been experienced in such systems in properly spacing the glass beads from the reflective background to yield the so-called space coat. Further, for certain purposes a traffic marker is desirable that has specular reflective properties.

It is an object of the present invention to provide a novel type of specular reflective granule that can be used in highway markers.

A further object of the present invention is to provide a novel specularly reflective highway marker.

A still further object of the present invention is to provide a premix traffic paint incorporating these novel specular reflective granules.

Another object of the present invention is to provide a specular reflective granule having a built-in space coat.

Another object of the present invention is to provide a reflective granule coated with a mono-layer of small glass beads.

A still further object of the present invention is to provide a premix which is immediately reflective.

Other objects and the nature and advantages of the present invention will be apparent from the following description taken in conjunction with the accompanying drawings wherein.

Figure 1:
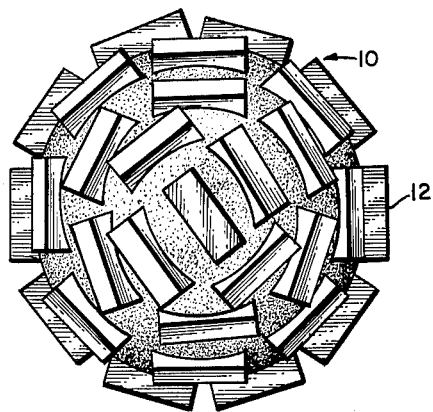
FIG. 1 is an enlarged plan view of a specular reflective granule in accordance with the present invention.

The specularly reflective granule in accordance with the present invention is a suitably solidified binder of generally spherical shape having its outer surface covered with small flat pieces of silvered glass flakes.

These reflective granules can be made by rolling a droplet of the binder in a mass of the silvered flat glass flakes which adhere tangentially to the binder. The binder is then solidified to yield the granule of binder with the silvered glass flakes tangentially adhering to the entire outer surface thereof.

The resulting granule has a reflectivity which is specular, and at any given position of the observer and the light source, certain of the silvered glass flakes will reflect toward the observer. This is because of the relatively random orientation, and thus reflection is obtained from any angle or position. Thus, when the observer is in continuous motion, such as the driver of a car, the reflective points blend together to form the outline of a marker such as a traffic line, sign, or the like.

The reflective granules in accordance with this invention can have diameters up to 50 mils. The silvered glass flakes used are sometimes called glass tinsel and can have a maximum length up to 25% of the core diameter of the granule, e.g. up to 12.5 mils. The thickness of the silvered glass flakes can vary from 0.5–4 mils depending on the optical requirements when it acts as a space coat.

The core of the granule can be made of any material to which the silvered glass flakes will adhere and which has the strength properties required for use in highway marking and in signs. Particularly good results have been obtained using as a core, epoxy resins, polyester resin compositions, thermosetting polystyrene resins and other thermosetting resins which solidify rapidly while in contact with the silvered glass flakes, hot melt plasticized ethyl cellulose, rubber derivatives modified with hard resin and plasticizers, and the like.

The core material can include fillers, such as calcium carbonate, asbestine, woodflour, crushed stones or fine glass beads. By these means, an aggregate granule can be made that floats in binders, petroleum solvents or water.

When the core is such that it requires heat for solidifying, the heat may be supplied through the heated flakes, by an oven, or by the heated flakes followed by heating in an oven. On the other hand, when suitable catalysts and accelerators are added to the core material, the solidification may be accomplished at room temperatures so that no additional heat is required.

According to one method of manufacture, the silvered glass flakes can be maintained at a temperature of 200–400° F. The heated flakes coming into contact with the core droplets will lower the viscosity thereof during the very short interval of time required for the flakes to become partially tangentially embedded in the droplets. Immediately, however, because of the heat transferred, the droplets now covered with the silvered glass flakes starts to cure to a solid granule. The curing can be completed when necessary by conveying the coated granules into an oven.

Good results can also be obtained by using large low index glass beads wetted with a curing epoxy as the core material. This core material is rolled in the flat reflective glass flakes before the epoxy resin is cured so that the glass flakes adhere tangentially to the core when the epoxy resin has cured.

In the drawings, in FIG. 1, a reflective granule 10 is shown which is almost completely covered with silvered glass flakes 12. As shown in the cross section of FIG. 2, the silvered glass flakes 12 are partially embedded tangentially in the core material 14 and the core material has no flakes completely enclosed therein. As shown, each glass flake 12 is coated with a metallic reflective material 16. FIG. 3 shows the granule of FIG. 2 after the outer exposed reflective coating has been removed from the glass flakes so that each glass flake has the reflective coating 16 only on its embedded portion. The outer reflective coating may be removed by washing with an acid, for example, nitric acid, although other suitable methods can be used.

Figure 4:
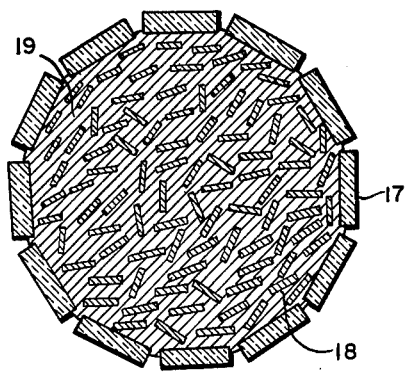

As shown in FIG. 4, glass flakes 17 can be used without a reflective coating when the core material itself is rendered reflective. For example, aluminum powder flakes 18 may be added to the core material to render it reflective so that the back surface of the uncoated glass flake 17 will be in contact with the reflective core 19. This eliminates the necessity for desilvering the glass flakes, and forms an automatic space coat the thickness of the glass flakes.

Figure 2:
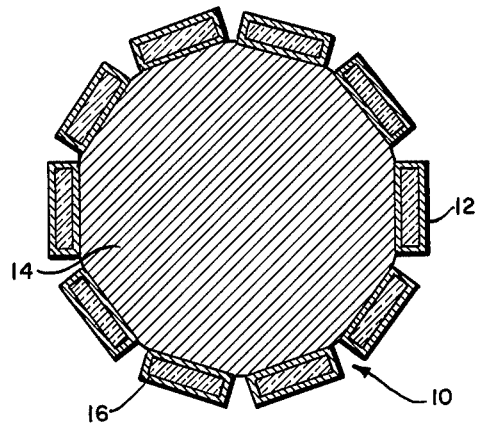
FIG. 2 is a cross sectional view through the granule of FIG. 1.
Figure 3:
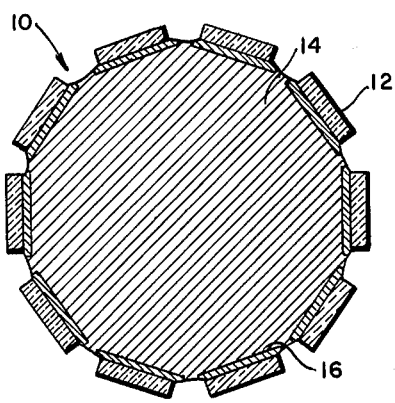
FIGS. 3–5 are cross sectional views through modified forms of granules.
Figure 6:
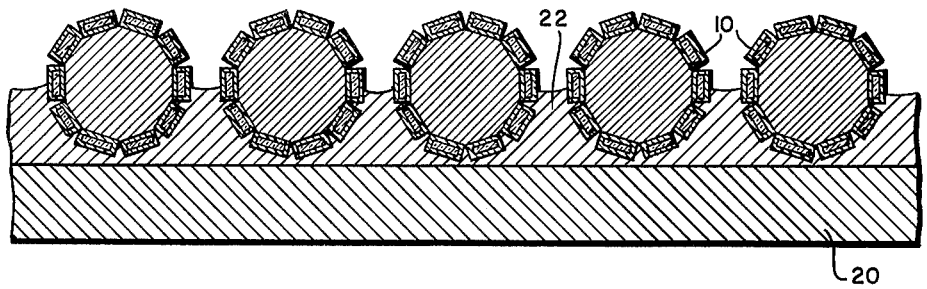
FIGS. 6 and 7 are sectional views through markers showing the granules partially embedded in a binder coating.

The granules as shown in FIG. 2 covered with the silvered glass flakes may be used without further treatment in the same manner that glass beads have been previously used, either dropped onto the tacky surface of a marker or premixed into the marking composition. As shown in FIG. 6, a base 20 is coated with a binder 22 into which the reflective granules 10 of the present invention have been partially embedded. This resulting marker is specularly reflective and will reflect the light from the headlights of opposing traffic as well as the light from one's own headlights. These markers will also reflect overhead lighting in towns and on parkways.

Figure 5:
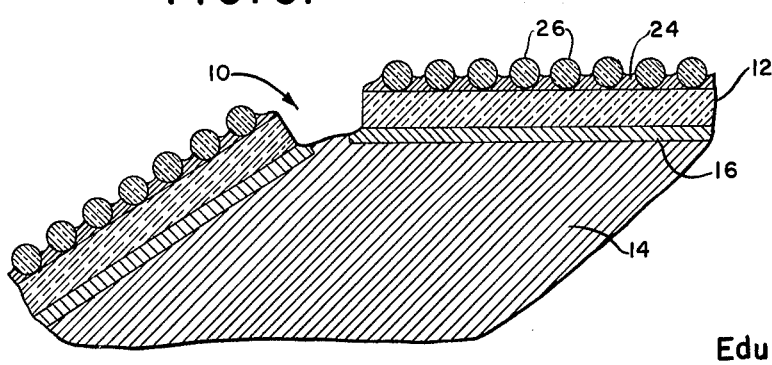
Figure 7:
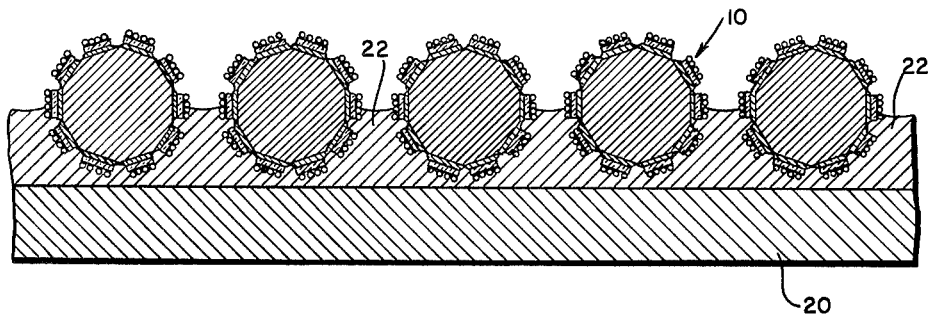

As shown in FIG. 5, the granule 10 of FIG. 3, after the outer surfaces have been desilvered, is covered with a thin coat of a binder material 24 and a monolayer of small glass beads 26 are partially embedded therein. FIG. 7 shows a marker which includes a base 20 coated with a binder 22 into which the reflective granules 10 of FIG. 5 have been partially embedded. The diameters of the small glass beads 26 are, of course, much smaller than the diameter of the core, e.g. approximately 5–25% of the diameter of the core. The reflective index of the glass beads may be in the range of about 1.90–2.50.

The granule shown in FIG. 5 has a space behind each glass bead which is the thickness of the glass flake 12 between the glass bead and the reflective surface. This gives greatly improved results.

The reflective granules made in accordance with the present invention can be further wetted with a small quantity of clear transparent colored binder which, upon drying, will deliver encapsulated transparent separate colored aggregates which can be used as reflective elements for any use where glass beads are generally used for reflectivity.

Figure 8:
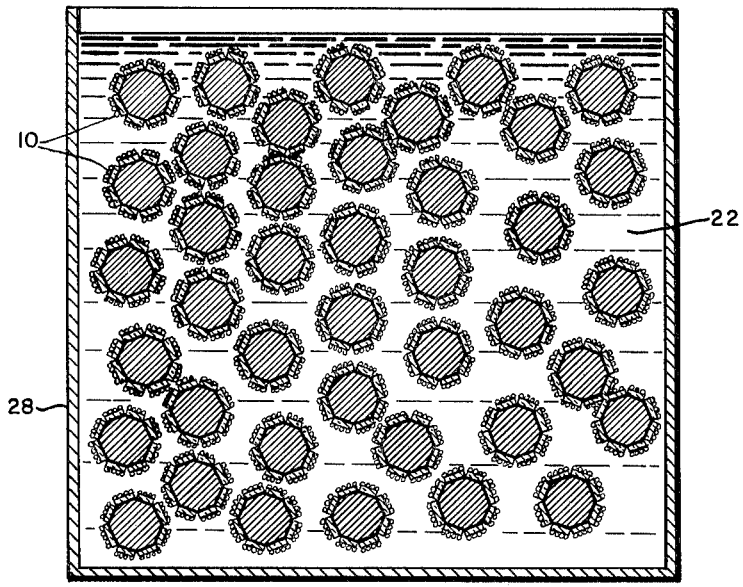
FIG. 8 is a cross sectional view through a container containing a premix of the granules of FIG. 5 in a transparent binder.

The granules 10 of FIG. 5 can be premixed with the transparent binder 22 in a container 28 as shown in FIG. 8. When the premix is applied onto a base such as a sign or a road, the coating will be immediately reflective.

The epoxy resins employed in accordance with this invention are commonly referred to as polyglycidyl ethers of polyhydric alcohols and glycidyl ethers of bis-phenols, characterized by the following general formula:

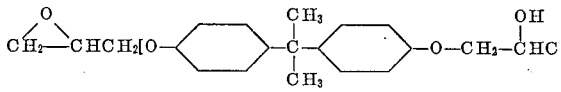 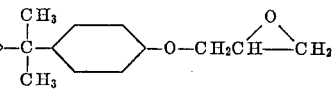

wherein $n$ represents the extent of copolymerization and varies between 0 and 10 indicating molecular weights of 400 to approximately 8000. These products contain both epoxide and hydroxyl groups capable of further reaction. It is the combination of these groups with the curing agent that results in the cured resin systems. Various amines, such as ethylene diamine, triethylene tetramine, dimethyl amino methyl phenol, tri (dimethyl amino methyl) phenol, diamino diphenyl sulfone, metaphenylene diamine, and diethyl aminopropylamine, acid anhydrides, organic sulfonic acids, dibasic acids and resins, such as polyamides, are typical curing agents.

The epoxy resins are commercially sold by Shell Chemical Corp. under the trade names of Epons. Epon 828, for example, has a melting point of 8–12° C. and an epoxide equivalent ranging between 190–210. By the epoxide equivalency is meant the average number of 1,2-epoxy groups contained in the average molecule. It is expressed in the trade as the grams of the polymeric material or resin containing one gram equivalent of epoxide.

It should be understood that the epoxy resins suitable for use in this invention are not limited to those described above. Any resinous material containing reactive epoxy groups whether aliphatic or aromatic, may be used so long as the material will cure in the presence of curing agents to a solid condition. For example, a dicyclo-diepoxy carboxylate resin may be used which is sold by Union Carbide and Carbon Co. as Epoxide 201.

When an epoxy resin is used as the binder, a heat sensitive catalyst may be used which yields a composition that is stable at room temperatures and which cures when heated. Such a catalyst is a boron fluoride amine complex.

A specific example of a formualtion which has given excellent results is:

Example 1

| | Parts by weight |
|---|---|
| Epoxy resin (Epon 828) | 100 |
| Catalyst for epoxy resin (diethylene triamine) | 10 |

The core material was spun into droplets off a rotating disc onto a conveyor belt containing a layer of small reflectively coated glass flakes. The droplets picked up the flakes to cover their surfaces and solidified with the flakes tangentially arranged on the core. The resulting granules are approximately spherical but their facets formed by the glass flakes are flat. These granules are highly specularly reflective.

These granules were dropped onto a tacky painted traffic line. After drying the resulting line was found to be specularly reflective and reflected back to a driver not only his own headlights, but also those of oncoming traffic and overhead lights.

These granules were also premixed with a liquid colored transparent binder which was sprayed onto a surface to yield an instantaneously reflective surface.

Example 2

The granules made in accordance with Example 1 were washed in nitric acid to remove the outer exposed reflective coating from the glass flakes.

A mass of these desilvered granules was wetted with a clear curing epoxy resin. Only enough epoxy resin was added to wet out the surfaces of these polygon spheroids. An excess of small glass beads having a refractive index of about 1.90 was added and mixing was continued until the mass of granules became free flowing with a monolayer of glass beads adhering to the flat surfaces of the desilvered glass flakes. After curing was completed, the cured free flowing granules were premixed with a liquid colored transparent binder and could be sprayed as a colored instantaneously reflective premix.

Example 3

| | Parts by weight |
|---|---|
| Polyester resin composition | 100 |
| Aluminum flakes | 30 |
| Benzoyl peroxide | 5 |

This core material was sprayed onto a layer of glass flakes which were maintained at a temperature of approximately 300° F. The liquid droplets picked up the glass flakes and became cured with the glass flakes tangentially adhering to their outer surfaces. After passing through an oven the resulting granules were found to be specularly reflective and useful in reflective markers.

Example 4

These granules were coated with a monolayer of small glass beads as in Example 2. The resulting granules were found to have built-in space coats of the proper thickness controlled by the thickness of the flakes used and the refractive index of the glass beads.

The polyester resin composition comprises an unsaturated polyester resin and a monomeric polymerizable material that does not give off volatile matter during curing. In general, polyester resins are unsaturated resins formed by reaction of one or more dicarboxylic acid components and one or more polyhydric alcohols. One or more of the acid components or polyhydric alcohols should contain a reactive double or ethylene linkage. The polyester reactive products are mixed with a non-volatile unsaturated monomeric cross linking agent for the polyester resin. Suitable catalysts and accelerators are added to cure the polyester resin composition.

It will be obvious to those skilled in the art that various changes may be made without departing from the spirit of the invention and, therefore, the invention is not limited to what is shown in the drawings and described in the specification but only as indicated in the appended claims.

What is claimed is:

1. An immediately reflective marking material comprising a transparent liquid binder material containing a plurality of reflective granules, said granules each comprising a core of a solidified material covered with a plurality of small thin flat glass flakes adhering tangentially to the outer surface of said core, the glass flakes being reflectively coated on the embedded portion thereof, the outer flat surfaces of said glass flakes having a thin coat of a binder material containing a monolayer of small glass beads in contact with the outer surfaces of said glass flakes.

2. An immediately reflective marking material comprising a transparent liquid binder material containing a plurality of reflective granules, said granules each comprising a core of a solidified reflective material covered with a plurality of small thin flat glass flakes adhering tangentially to the outer surface of said core, and the outer flat surfaces of said glass flakes having a thin coat of a binder material containing a monolayer of small glass beads in contact with the outer surfaces of said glass flakes.

3. A reflex reflective granule comprising a core of a solidified material covered with a plurality of small thin flat glass flakes tangentially adhering to the outer surface of said material, the outer flat surfaces of said glass flakes having a thin coat of a binder material containing a monolayer of small glass beads in contact with said glass flakes.

4. A granule in accordance with claim 3 wherein the core is reflectively pigmented with metallic particles.

5. A granule in accordance with claim 3 wherein the core is an epoxy resin, said epoxy resin comprising at least one resinous material containing reactive epoxy groups curable to a solid state.

6. A granule in accordance with claim 3 wherein the glass flakes are reflectively coated on the embedded portion thereof.

7. A reflective marker which comprises a layer of a binder material having a plurality of reflex reflecting granules partially embedded therein, said granules each comprising a core of a solidified material covered with a plurality of small thin flat glass flakes tangentially adhering to the outer surface of said material, the outer flat surfaces of said glass flakes having a thin coat of a binder material containing a monolayer of small glass beads in contact with said glass flakes.

8. A reflective marker in accordance with claim 7 wherein the core is reflectively pigmented with metallic particles.

9. A reflective marker in accordance with claim 7 wherein the core is an epoxy resin, said epoxy resin comprising at least one resinous material containing reactive epoxy groups curable to a solid state.

10. A reflective marker in accordance with claim 7 wherein the glass flakes are reflectively coated on the embedded portion thereof.

11. A granule in accordance with claim 3 wherein the entire granule is encapsulated in a coating of a clear transparent binder.

12. A granule in accordance with claim 3 wherein the entire granule is encapsulated in a coating of a clear transparent binder.

References Cited by the Examiner

UNITED STATES PATENTS

| | | |
|---|---|---|
| 1,810,168 | 6/1931 | Gray. |
| 1,986,591 | 1/1935 | Meyer. |
| 2,133,988 | 10/1938 | Harshberger. |
| 2,355,430 | 8/1944 | Flood. |
| 2,372,868 | 4/1945 | Warren _____ 88—82 X |
| 2,555,715 | 6/1951 | Tatum _____ 88—82 |
| 2,704,105 | 3/1955 | Robinson et al. _____ 161—163 |
| 2,865,266 | 12/1958 | Wynn. |
| 2,952,192 | 9/1960 | Nagin. |
| 3,025,764 | 3/1962 | McKenzie _____ 88—82 |
| 3,043,196 | 7/1962 | Palmquist et al. _____ 88—82 |
| 3,050,824 | 8/1962 | Lemelson _____ 88—82 X |
| 3,175,935 | 3/1965 | Vanstrum _____ 88—82 X |

FOREIGN PATENTS 735,578   8/1932   France.

JEWELL H. PEDERSEN, *Primary Examiner.*

D. J. HOFFMAN, T. L. HUDSON,
*Assistant Examiners.*